(12) United States Patent
Singh et al.

(10) Patent No.: US 10,015,093 B2
(45) Date of Patent: Jul. 3, 2018

(54) COMMUNICATION TRANSMISSION SYSTEM FOR COMMUNICATION PROTOCOL FAILURES

(71) Applicant: Dell Products L.P., Round Rock, TX (US)

(72) Inventors: Ankit Singh, Karnataka (IN); Shekar Babu Suryanarayana, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 491 days.

(21) Appl. No.: 14/704,722

(22) Filed: May 5, 2015

(65) Prior Publication Data

US 2016/0330119 A1 Nov. 10, 2016

(51) Int. Cl.
*G06F 15/16* (2006.01)
*H04L 12/749* (2013.01)
*H04L 29/06* (2006.01)

(52) U.S. Cl.
CPC .......... *H04L 45/741* (2013.01); *H04L 69/167* (2013.01); *H04L 69/18* (2013.01)

(58) Field of Classification Search
CPC ...... H04L 69/167; H04L 69/18; H04L 45/741
USPC .......................................... 709/245; 370/466
See application file for complete search history.

(56) References Cited

U.S. PATENT DOCUMENTS

| 7,088,726 B1* | 8/2006 | Hamamoto ....... H04L 29/12358 370/401 |
| 7,305,481 B2* | 12/2007 | Blanchet ................. H04L 69/16 370/389 |
| 8,417,831 B2* | 4/2013 | Ge ..................... H04L 12/4633 709/230 |

(Continued)

FOREIGN PATENT DOCUMENTS

| WO | WO2005069576 | 7/2005 |
| WO | WO2009078564 | 6/2009 |

OTHER PUBLICATIONS

Geoff Huston, The ISP Column, Aug. 2007, www.pataroo.net, Transition to IPv6, Six Pages.*

(Continued)

*Primary Examiner* — Joseph E Avellino
*Assistant Examiner* — Binod J Kunwar
(74) *Attorney, Agent, or Firm* — Haynes and Boone, LLP (57) ABSTRACT

A communication transmission system includes a server client couple by a network. The client includes a first protocol client application that uses a first communication protocol, a client first protocol stack that communicates using the first communication protocol, and a client second protocol stack that communicates using a second communication protocol different from the first communication protocol. The client sends a first communication payload from the first protocol client application to the server using the client first protocol stack. If an error is received sending of the first communication payload, a copy of the first (Continued)

communication payload is sent to the server using the client second protocol stack. A second communication payload is then received from the server using the client second protocol stack in response to sending the first communication payload, and the second communication payload is provided to the first protocol application using the client first protocol stack.

20 Claims, 8 Drawing Sheets

(56) References Cited

U.S. PATENT DOCUMENTS

| | | | | |
|---|---|---|---|---|
| 8,509,185 | B2* | 8/2013 | Haddad | H04L 29/12358 370/331 |
| 8,510,474 | B2* | 8/2013 | Van Aken | H04L 12/4633 370/466 |
| 8,891,551 | B2* | 11/2014 | Park | H04L 12/4633 370/395.5 |
| 9,584,472 | B2* | 2/2017 | Lyon | H04L 67/2814 |
| 2002/0021703 | A1* | 2/2002 | Tsuchiya | H04L 12/66 370/401 |
| 2004/0013130 | A1* | 1/2004 | Blanchet | H04L 69/16 370/466 |
| 2006/0259608 | A1* | 11/2006 | Kim | H04L 12/4633 709/223 |
| 2007/0147421 | A1* | 6/2007 | Kim | H04L 12/66 370/466 |
| 2008/0212609 | A1* | 9/2008 | Yoshimoto | H04L 69/16 370/466 |
| 2008/0317064 | A1* | 12/2008 | Choi | H04W 80/045 370/466 |
| 2009/0304026 | A1* | 12/2009 | Hamada | H04L 29/12358 370/466 |
| 2010/0260203 | A1* | 10/2010 | Moon | H04W 80/045 370/467 |
| 2011/0013647 | A1* | 1/2011 | Park | H04L 12/4633 370/466 |
| 2011/0110374 | A1* | 5/2011 | Boucadair | H04L 29/12358 370/393 |
| 2012/0047572 | A1* | 2/2012 | Duncan | H04L 63/0245 726/13 |
| 2013/0097336 | A1 | 4/2013 | Lu et al. | |
| 2013/0103848 | A1* | 4/2013 | Lyon | H04L 67/2814 709/230 |
| 2013/0235871 | A1* | 9/2013 | Brzozowski | H04L 69/08 370/392 |
| 2014/0006638 | A1* | 1/2014 | Kavanagh | H04L 12/6418 709/236 |
| 2014/0056301 | A1* | 2/2014 | Hu | H04L 69/22 370/392 |
| 2016/0142291 | A1* | 5/2016 | Polland | H04L 45/36 370/392 |

OTHER PUBLICATIONS

NTT Labs [Katsuyasu Toyama, Tomohiro Fujisaki, Arifumi Matsumoto, Shiro Niinobe], Clear and Present Danger of IPv6, Jan. 2012, www.nanog.org/meetings, Episode 2, Sixteen Pages.*
EDK II, "EDK II," p. 1, http://www.tianocore.org/edk2/.
Internet Connection Failure Using IPv6, Internet Connection Failure Using IPv6 / TuxRadar Linux, pp. 1-2, Future Publishing Limited, Beauford Court, 30 Mammouth Street, Bath BA1 2BW, All rights reserved, England and Wales Company Registration No. 2008885, http:/www.tuxradar.com/answers.562.
Why Do I Get "General Failure" When Pinging Host Name on a Win 7 Node on the Network?, "windows 7—Why Do I Get "General Failure" When Pinging Host Name on a Win 7 Node on . . . " Jun. 6, 2012, pp. 1-4, http://superuser.com/questions/433416/why-do-i-get-general-failure-when-pinging-host-nam. . . .
My Tech Blog, "My Tech Blog: Windows Server 2012—Ipv6—PING: transmit failed. General Failure," Nov. 9, 2013, pp. 1-6, http://davidmtechblog.blogspot.in/2013/11/windows-server-2012-ipv6-ping-transmit.html.
Mark Townsley, "IPv6 via IPv4 Service Provider Networks—"6rd" Technical & Operational Overview," Oct. 2009, CISCO; 19 Pages.
IPv6 Traffic Between Nodes on Different Subnets of an IPv4 Internetwork, "Microsoft Windows XP-IPv6 Traffic Between Nodes on Different Subnets of an IPv4 inter . . . ," 2015, pp. 1-4, Microsoft Corporation, https://www.microsoft.com/resources.documentation/windows/xp/all/proddocs/en-us/sag_i . . . .

* cited by examiner

COMMUNICATION TRANSMISSION SYSTEM FOR COMMUNICATION PROTOCOL FAILURES

BACKGROUND

The present disclosure relates generally to information handling systems (IHSs), and more particularly to a system that transmits communications for IHSs in response to a communication protocol failure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventionally, IHSs such as client systems and server systems have communicated using the Internet Protocol version 4 (IPv4) communication protocol. The IPv4 communication protocol is a connectionless communication protocol that is used on packet-switched networked and that operates on a best effort delivery module that does not guarantee delivery or assure proper sequencing or avoidance of duplicate delivery (such aspects are typically addressed by an upper layer protocol such as the Transmission Control Protocol (TCP)). IPv4 was the first publicly used version of the Internet Protocol, and includes an addressing system that uses numerical identifiers consisting of 32 bits, with addresses typically displayed in quad-dotted notation (e.g., 172.16.254.1) as decimal values of four octets each in the range 0 to 255 (8 bits per number). Thus, IPv4 provides an addressing capability of approximately 4.3 billion addresses. As the addresses available using IPv4 have become exhausted, development has begun on the Internet Protocol version 6 (IPv6). IPv6 uses a 128-bit address, allowing approximately $3.4 \times 10^{38}$ addresses (more than $7.9 \times 10^{28}$ times as many as IPv4). However the two protocols are not designed to be interoperable, which has complicated the transition to IPv6.

For example, an IPv6 application on a client system may communicate with an IPv6 application on a server system using IPv6. In the event of an error in the IPv6 communication, the IPv6 application(s) on the client system and/or server system will be informed of the error and will cease operating properly. In order to have the IPv6 application(s) subsequently operate correctly, the error on the IPv6 protocol stack in either or both of the client system and the server system must then be fixed, or else the IPv6 applications must be modified to IPv4 applications to work using IPv4 protocol stacks on the client system and the server system. Both solutions are time consuming and/or expensive to implement.

Accordingly, it would be desirable to provide a communication transmission system for communication protocol failures.

SUMMARY

According to one embodiment, an information handling system (IHS) includes a first protocol application that uses a first communication protocol; a first protocol stack that is configured to transmit and receive communications using the first communication protocol; a second protocol stack that is configured to transmit and receive communications using a second communication protocol that is different than the first communication protocol; and a processing system and a memory system that includes instruction that, when executed by the processing system, cause the processing system to provide a communication engine that is configured to: send a first communication payload from the first protocol application through a network using the first protocol stack; receive an error associated with the sending of the first communication payload using the first protocol stack and, in response, send a copy of the first communication payload through the network using the second protocol stack; receive a second communication payload through the network using the second protocol stack, wherein the second communication payload is received in response to sending the first communication payload using the second protocol stack; and provide the second communication payload to the first protocol application using the first protocol stack.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
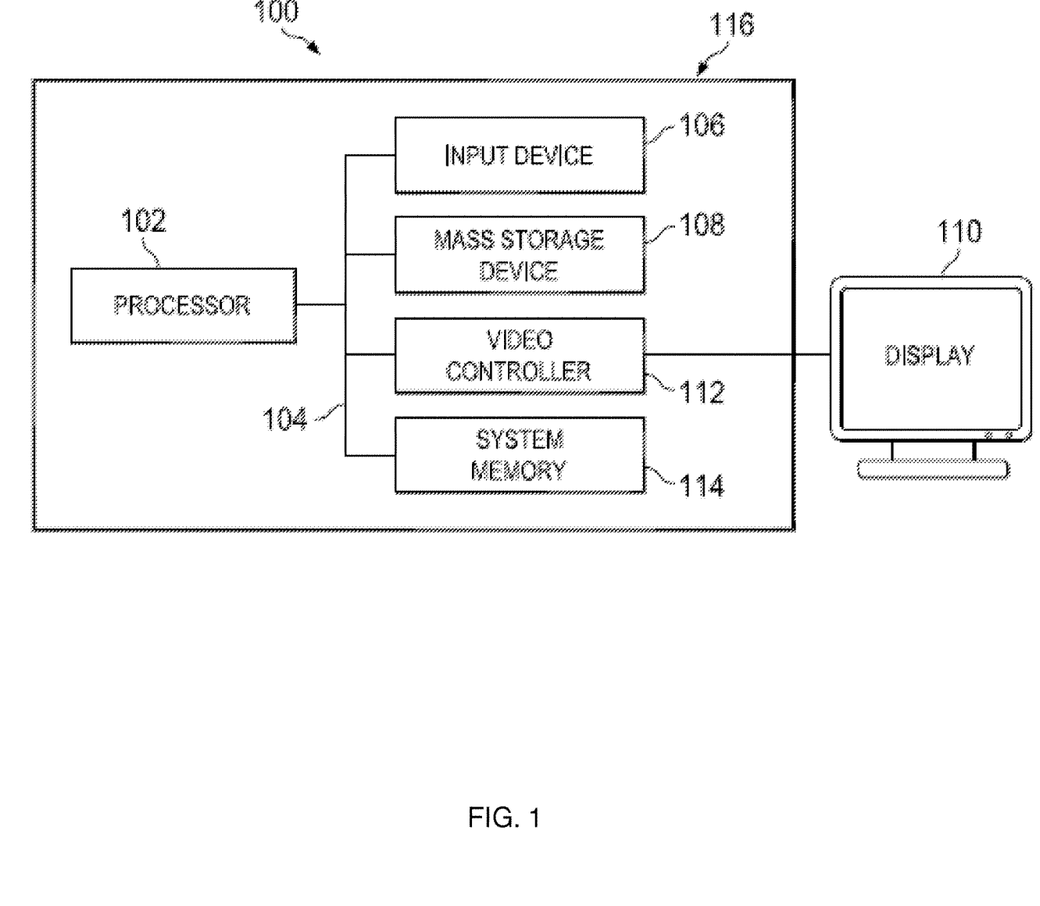
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
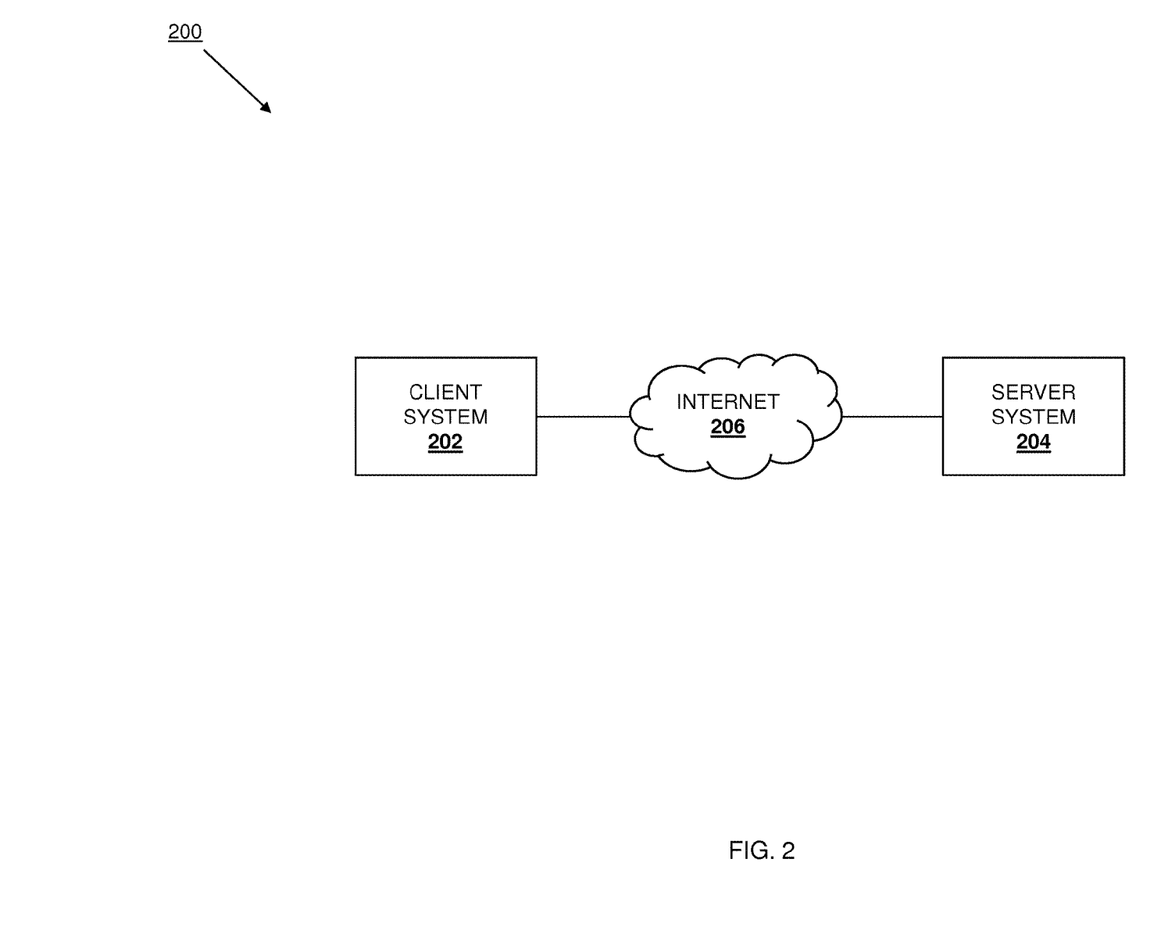
FIG. 2 is a schematic view illustrating an embodiment of a communication transmission system.

Referring now to FIG. 2, an embodiment of a communication transmission system 200 is illustrated. In the illustrated embodiment, the communication transmission system 200 includes a client system 202 that is connected to a server system 204 through the Internet 206. The client system 202 and/or the server system 204 may be the IHS 100 discussed above with reference to FIG. 1, and/or may include some or all of the components of the IHS 100. In the embodiments discussed below, the client system 202 may include a variety of client systems known in the art such as desktop computers, laptop/notebook computers, tablet computers, phones, etc. However, one of skill in the art in possession of the present disclosure will recognize that the client system 202 may include server computers and/or a variety of other computing systems while remaining within the scope of the present disclosure. In many of the embodiments discussed below, the client system 202 is discussed as being a source system that is the source of a first communication payload and that may be provided by any computing system known in the art that, for example, utilizes an application for creating that first communication payload. However, despite such discussions (which are provided for clarity in describing the embodiments below), the client system 202 should not be interpreted as only providing a source system for creating first communication payloads, as one of skill in the art in possession of the present disclosure will recognize that the client system 202/source system may include the functionality of the destination systems discussed below as well.

In the embodiments discussed below, the server system 204 may include one or more server computers. However, one of skill in the art in possession of the present disclosure will recognize that the server system 204 may include network computers (e.g., switches, routers, and/or a variety of other network computer known in the art), storage computers, and/or a variety of other computing systems while remaining within the scope of the present disclosure. In many of the embodiments discussed below, the server system 204 is discussed as being a destination system that is the destination of a first communication payload sent by a source system, and that provides a second communication payload in response to receiving that first communication payload. As such, the server system 204 may be provided by any computing system known in the art that, for example, utilizes an application for receiving and responding to communication payloads. However, despite such discussions (which are provided for clarity in describing the embodiments below), the server system 204 should not be interpreted as only providing a destination system for receiving and responding to communication payloads, as one of skill in the art in possession of the present disclosure will recognize that the server system 204/destination system may include the functionality of the source systems discussed below as well. Furthermore, while the client system 202 and the server system 204 are illustrated as connected together through the Internet 206, one of skill in the art will recognize how the teachings of the present disclosure may be utilized by client/source systems and server/destination systems connected through other types of networks while remaining within the scope of the present disclosure.

Figure 3:
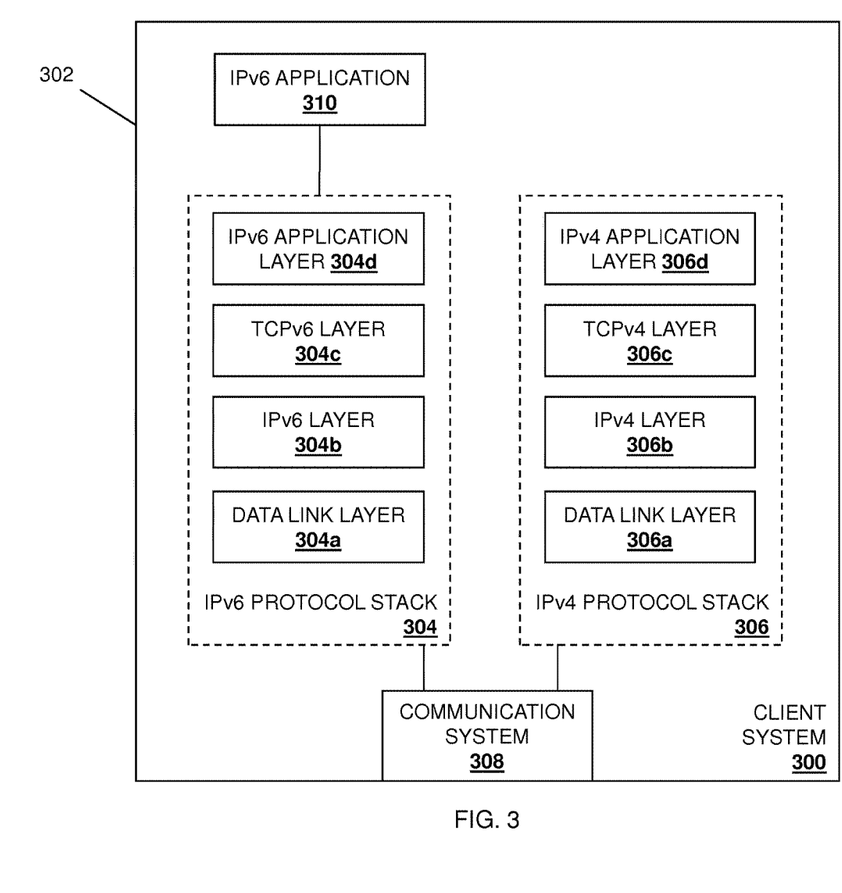
FIG. 3 is a schematic view illustrating an embodiment of a client system in the communication transmission system of FIG. 2.

Referring now to FIG. 3, an embodiment of a client system 300 is illustrated. In some embodiments, the client system 300 may be the client system 200 discussed above with reference to FIG. 2, the IHS 100 discussed above with reference to FIG. 1, and/or a system including some or all of the components of the IHS 100. The client system 300 includes a chassis 302 that houses a processing system (not illustrated, but which may include one or more of the processor 102 discussed above with reference to FIG. 1) and a memory system (not illustrated, but which may include the system memory 114 discussed above with reference to FIG. 1) that includes instructions that, when executed by the processing system, cause the processing system to provide a first communication protocol stack (hereinafter "first protocol stack") and a second communication protocol stack (hereinafter "second protocol stack"). In the embodiment illustrated in FIG. 3 and described in further detail below, the first protocol stack is an Internet Protocol version 6 (IPv6) protocol stack 304 and the second protocol stack is an Internet Protocol version 4 (IPv4) protocol stack 306. However, one of skill in the art in possession of the present disclosure will recognize that the teachings of the present disclosure may be applied to different protocols and protocol stacks while remaining within the scope of the present disclosure.

One of skill in the art will recognize that the client system 300 illustrated in FIG. 3 includes a dual-stack (or native dual-stack) IP implementation that provides a complete IPv6 protocol stack 304 and a complete IPv4 protocol stack 306 in the same chassis 302, which facilitates native communication between the client system 300/source system and destination systems using either the IPv4 communication protocol or the IPv6 communication protocol, as defined in the Request for Comments (RFC) 4213 published by the Internet Engineering Task Force (IEFT) and the Internet Society. In the illustrated embodiment, the IPv6 protocol stack 304 includes a data link layer 304a, an IPv6 layer 304b, a Transmission Control Protocol (TCP)v6 layer 304c, and an IPv6 application layer 304d; and the IPv4 protocol stack 306 includes a data link layer 306a, an IPv4 layer 306b, a TCPv4 layer 306c, and an IPv4 application layer 306d. The details of the Internet protocol suite including the link layers (e.g., data link layers 304a/306a), the Internet layers (e.g., IPv6/IPv4 layers 304b/306b), the transport layers (e.g., TCPv6/TCPv4 layers 304c/306c), and the application layers (e.g., IPv6/IPv4 application layers 304d/306d) are known in the art and will not be repeated here. However, such details can be found, for example, in RFCs 791, 792, 815, 816, 826, 879, 893, 894, 950, 1042, 1108, 1112, 1122, 1123, 2740, and 3439. Furthermore, one of skill in the art will recognize that other hardware and/or software (i.e., other than the processing system, memory system, and instructions discussed above) may be utilized in providing the IPv6 protocol stack 304 and the IPv4 protocol stack 306 in the client system 300, and that the IPv6 protocol stack 304 and/or the IPv4 protocol stack 306 may include additional and/or different features or elements that have not been illustrated for clarity.

In the illustrated embodiment, a communication system 308 is included in the client system 300 and coupled to each of the IPv6 protocol stack 304 and the IPv4 protocol stack 306. While illustrated as separate elements in the client system 308 for clarity of discussion below, the communication system 308 may incorporate or be part of elements of the IPv6 protocol stack 304 and the IPv4 protocol stack 306. For example, the communication system 308 may be part of the data link layers 304a and 304b or may include the physical and/or logical network components used to interconnect the client system 300 to a network, the link protocols that operate between the client system 300 and the network, and/or other elements of the IPv6 protocol stack 304 and the IPv4 protocol stack 306. The client system 300 includes an IPv6 application 310 that is coupled to the IPv6 protocol stack 304, and that may be provided by instructions on the memory system in the client system 300 that, when executed by the processing system in the client system 300, cause the processing system to perform the functions of the IPv6 application 310. In the embodiments discussed below, the IPv6 application 310 is a first protocol client application that uses the first communication protocol (e.g., the IPv6 communication protocol) and that is not configured to communicate using the second communication protocol (e.g., the IPv4 communication protocol). For example, the IPv6 application 310 may have been coded, programmed, and/or otherwise configured to communicate using the IPv6 communication protocol, and does not include code, programming, or other configuration details that would enable communication by the IPv6 application 310 using the IPv4 communication protocol. However, in some embodiments the present disclosure may be utilized by applications that are configured to communicate using both the IPv6 communication protocol and the IPv4 communication protocol.

Figure 4:
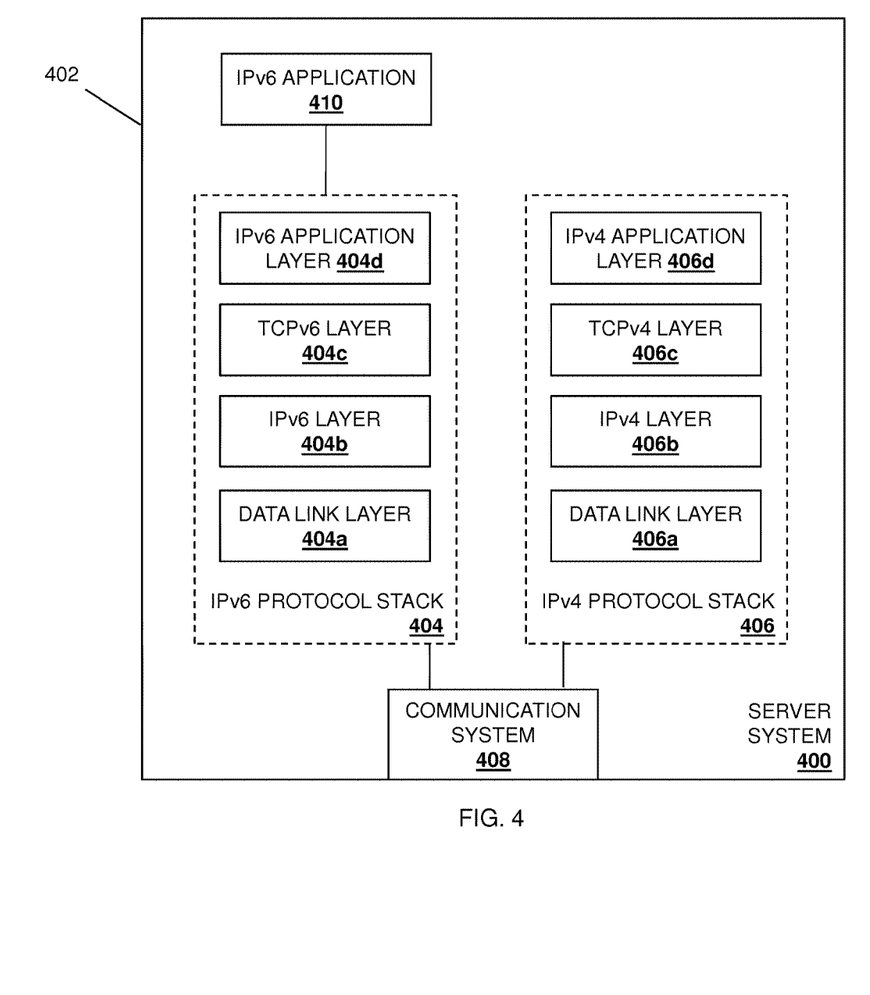
FIG. 4 is a schematic view illustrating an embodiment of a server system in the communication transmission system of FIG. 2.

Referring now to FIG. 4, an embodiment of a server system 400 is illustrated. In some embodiments, the server system 400 may be the server system 204 discussed above with reference to FIG. 2, the IHS 100 discussed above with reference to FIG. 1, and/or a system including some or all of the components of the IHS 100. The server system 400 includes a chassis 402 that houses a processing system (not illustrated, but which may include one or more of the processor 102 discussed above with reference to FIG. 1) and a memory system (not illustrated, but which may include the system memory 114 discussed above with reference to FIG. 1) that includes instructions that, when executed by the processing system, cause the processing system to provide a first communication protocol stack (hereinafter "first protocol stack") and a second communication protocol stack (hereinafter "second protocol stack"). In the embodiment illustrated in FIG. 4 and described in further detail below, the first protocol stack is an Internet Protocol version 6 (IPv6) protocol stack 404 and the second protocol stack is an Internet Protocol version 4 (IPv4) protocol stack 406. However, one of skill in the art in possession of the present disclosure will recognize that the teachings of the present disclosure may be applied to different protocols and protocol stacks while remaining within the scope of the present disclosure.

One of skill in the art will recognize that the server system 400 illustrated in FIG. 4 includes a dual-stack (or native dual-stack) IP implementation that provides a complete IPv6 protocol stack 404 and a complete IPv4 protocol stack 406 in the same chassis 402, which facilitates native communication between the server system 400/destination system and source systems using either the IPv4 communication protocol or the IPv6 communication protocol, as defined in the Request for Comments (RFC) 4213 published by the Internet Engineering Task Force (IEFT) and the Internet Society. In the illustrated embodiment, the IPv6 protocol stack 404 includes a data link layer 404a, an IPv6 layer 404b, a TCPv6 layer 404c, and an IPv6 application layer 404d; and the IPv4 protocol stack 406 includes a data link layer 406a, an IPv4 layer 406b, a TCPv4 layer 406c, and an IPv4 application layer 406d. The details of the Internet protocol suite including the link layers (e.g., data link layers 404a/406a), the Internet layers (e.g., IPv6/IPv4 layers 404b/406b), the transport layers (e.g., TCPv6/TCPv4 layers 404c/406c), and the application layers (e.g., IPv6/IPv4 application layers 404d/406d) are known in the art and will not be repeated here. However, such details can be found, for example, in RFCs 791, 792, 815, 816, 826, 879, 893, 894, 950, 1042, 1108, 1112, 1122, 1123, 2740, and 3439. Furthermore, one of skill in the art will recognize that other hardware and/or software (i.e., other than the processing system, memory system, and instructions discussed above) may be utilized in providing the IPv6 protocol stack 404 and the IPv4 protocol stack 406 in the server system 400, and that the IPv6 protocol stack 404 and/or the IPv4 protocol stack 406 may include additional and/or different features or elements that have not been illustrated for clarity.

In the illustrated embodiment, a communication system 408 is included in the server system 400 and coupled to each of the IPv6 protocol stack 404 and the IPv4 protocol stack 406. While illustrated as separate elements in the server system 408 for clarity of discussion below, the communication system 408 may incorporate or be part of elements of the IPv6 protocol stack 404 and the IPv4 protocol stack 406. For example, the communication system 408 may be part of the data link layers 404a and 404b, or may include the physical and/or logical network components used to interconnect the server system 400 to a network, the link protocols that operate between the server system 400 and the network, and/or other elements of the IPv6 protocol stack 404 and the IPv4 protocol stack 406. The server system 400 includes an IPv6 application 410 that is coupled to the IPv6 protocol stack 404, and that may be provided by instructions on the memory system in the server system 400 that, when executed by the processing system in the server system 400, cause the processing system to perform the functions of the IPv6 application 410. In some embodiments, the IPv6 application 410 may be a first protocol server application that uses the first communication protocol (e.g., the IPv6 communication protocol) and that is not configured to communicate using the second communication protocol (e.g., the IPv4 communication protocol). For example, the IPv6 application 410 may have been coded, programmed, and/or otherwise configured to communicate using the IPv6 communication protocol, and does not include code, programming, or other configuration details that would enable communication by the IPv6 application 410 using the IPv4 communication protocol. However, in some embodiments the present disclosure may be utilized by applications that are configured to communicate using both the IPv6 communication protocol and the IPv4 communication protocol.

Figure 5:
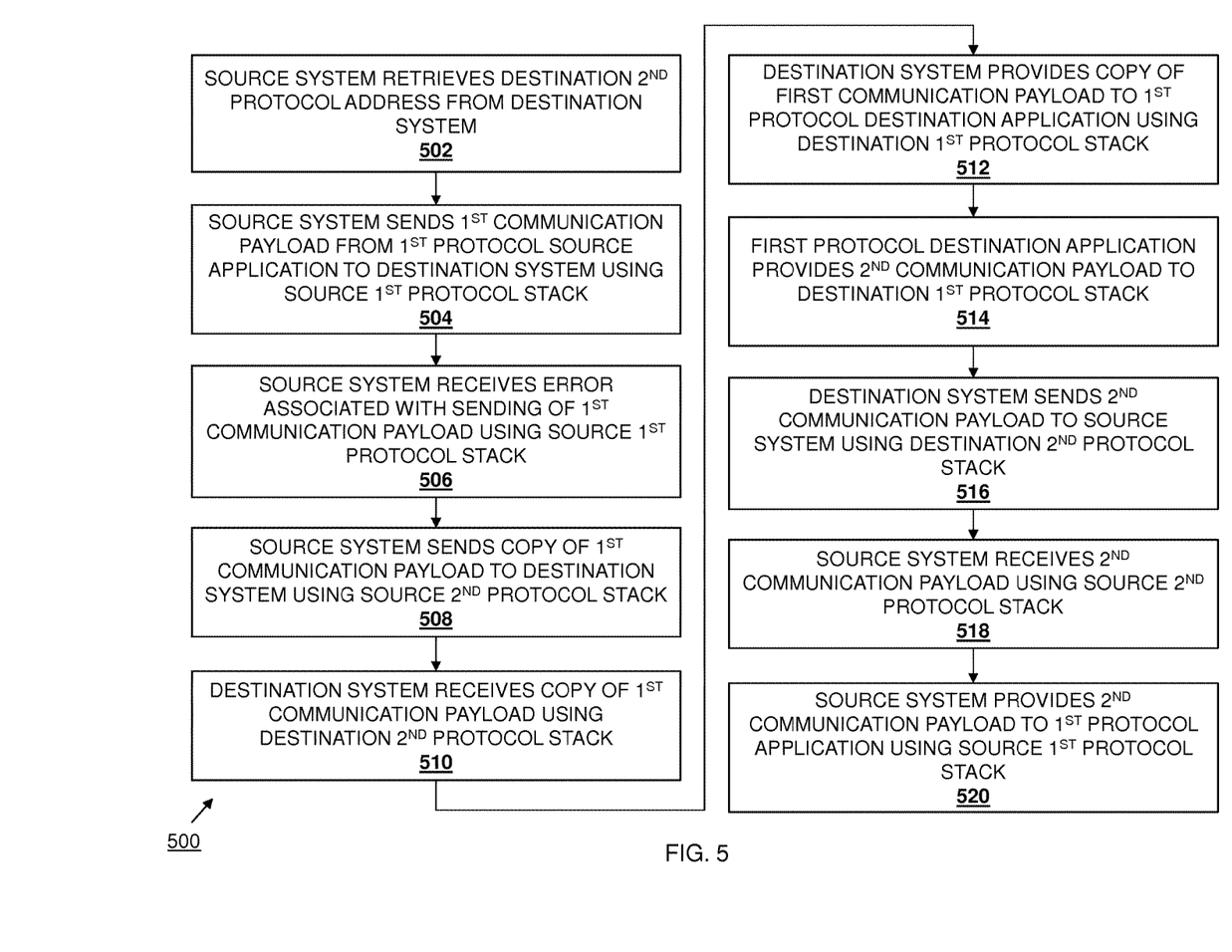
FIG. 5 is a flow chart illustrating an embodiment of a method for transmitting communications in response to a communication protocol failure.

Referring now to FIG. 5, an embodiment of a method 500 for transmitting communications is illustrated. As discussed above, when IPv6 applications on a source system and a destination system communicate using the IPv6 communication protocol via IPv6 protocol stacks, an error in the IPv6 communication may cause the IPv6 applications to cease operating properly. Conventionally, in order to have the IPv6 application(s) subsequently operate correctly, the error on the IPv6 protocol stack in either or both of the source system and the destination system must then be fixed, or else the IPv6 applications must be modified to IPv4 applications to work using IPv4 protocol stacks on the source system and the destination system. However, the method 500 provides, upon an error associated with the sending of a first communication from an IPv6 application in a source system to an IPv6 application in a destination system using the IPv6 communication protocol, for the sending of that first communication using an IPv4 protocol stack in the source system, the receiving of that first communication using an IPv4 protocol stack in the destination system, the provisioning of that first communication to an IPv6 application in the destination system using the IPv6 protocol stack in the destination. Furthermore, the method 500 provides for the sending of a second communication by the IPv6 application in the destination system (sent in response to the first communication) using an IPv4 protocol stack in the destination system, the receiving of that second communication using an IPv4 protocol stack in the source system, the provisioning of that second communication to an IPv6 application in the source system using the IPv6 protocol stack in the source system. As such, errors in IPv6 communications between a source and destination systems are handled using the IPv4 protocol stacks in the source and destination systems in a manner that is transparent to their respective IPv6 applications and, as a result, those errors do not require repair of the IPv6 protocol stacks or modification of the IPv6 applications.

The method 500 begins at block 502 where a source system retrieves a destination second protocol address from a destination system. Referring first to FIGS. 2, 3, and 4, the client system 202/300 (the source system in this embodiment) may be coupled to the Internet 206 via its communication system 308, and the server system 204/400 (the destination system in this embodiment) may be coupled to the Internet 206 via its communication system 408. When the IPv6 application 310 in the client system 300 needs to communicate with the IPv6 application in the server system 400, IPv6 communications are setup using methods known in the art that are not described here in detail for clarity of discussion, but that may include actions such as creating a socket with a socket ( ) system call by both the client system 202/300 and the server system 204/400, binding the socket to an address using a bind ( ) system call by the server system 204/400 (e.g., an address including a port number on the client system 202/300 for a server socket on the Internet), connecting the socket to an address of the server system 204/400 using a connect ( ) system call by the client system 202/300, listening for connections with a listen ( ) system call by the server system 204/400, accepting a connection with an accept ( ) system call by the server system 204/400, and/or other actions known in the art. Following the setup of IPv6 communications, the IPv6 application 310 in the client system 202/300 and the IPv6 application 410 in the server system 204/400 are configured to communication via the IPv6 protocol stacks 304 and 404, respectively, using the IPv6 communication protocol by, for example, sending and receiving data using read ( ) and write ( ) system calls.

Figure 6:
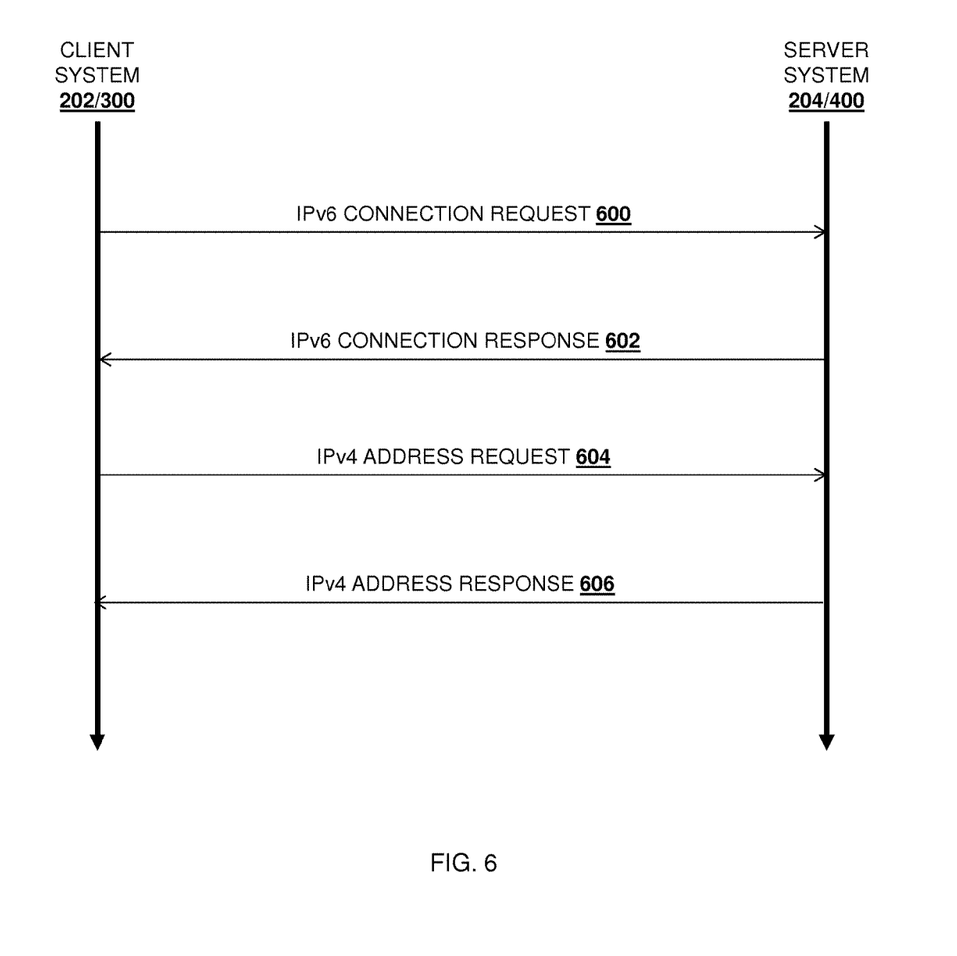
FIG. 6 is a flow diagram illustrating an embodiment of the client system of FIG. 3 communicating with the server system of FIG. 4 using a first communication protocol to retrieve a second communication protocol address of the server system.

In an embodiment, block 502 may be performed sometime during or immediately following the setup of the IPv6 communications. For example, referring now to FIG. 6, the client system 202/300 may send an IPv6 connection request 600 during IPv6 communication setup that is following the server system 204/400 granting the connection request in a IPv6 connection response 602. The client system 202/300 may then use the IPv6 communication protocol to send an IPv4 address request 604 to the server system 204/400, and the server system 204/400 may use the IPv6 communication protocol to send its IPv4 address in an IPv4 address response 606 to the client system 202/300. In response to retrieving the IPv4 address of the server system 204/400, the client system 300 may store the IPv4 address of the server system 204/400 in a memory system or other storage system known in the art. In different embodiments, the IPv4 address of the server system 204/400 (and the client system 202/300) may be configured statically, using a Dynamic Host Configuration Protocol (DHCP) server, and/or in a variety of other manners known in the art.

As discussed in further detail below, blocks 504-520 of the method may be performed each time a communication payload is sent between the IPv6 applications 310 and 410 in the client system 202/300 and the server system 204/400, respectively (e.g., during an application session between the IPv6 applications 310 and 410 following IPv6 communication setup, and prior to disconnection of the client system 202/300 and server system 204/400). In some embodiments, each communication (e.g., the sending of each packet from the client system 202/300 to the server system 204/400) may be attempted using the IPv6 communication protocol, and the IPv4 communication protocol may only be used as discussed below in the event of an error in the sending of that packet using the IPv6 communication protocol. However, in some embodiments, the IPv4 communication protocol may be used as discussed below for more than one packet following an error in the sending of an initial packet using the IPv6 communication protocol. Furthermore, block 502 of the method 500 may only need to be performed once for an application session between the IPv6 applications 310 and 410 following IPv6 communication setup and prior to disconnection of the client system 202/300 and server system 204/400, as the client system 202/300 may save the IPv4 address of the sever system 204/400 throughout that application session.

Figure 7:
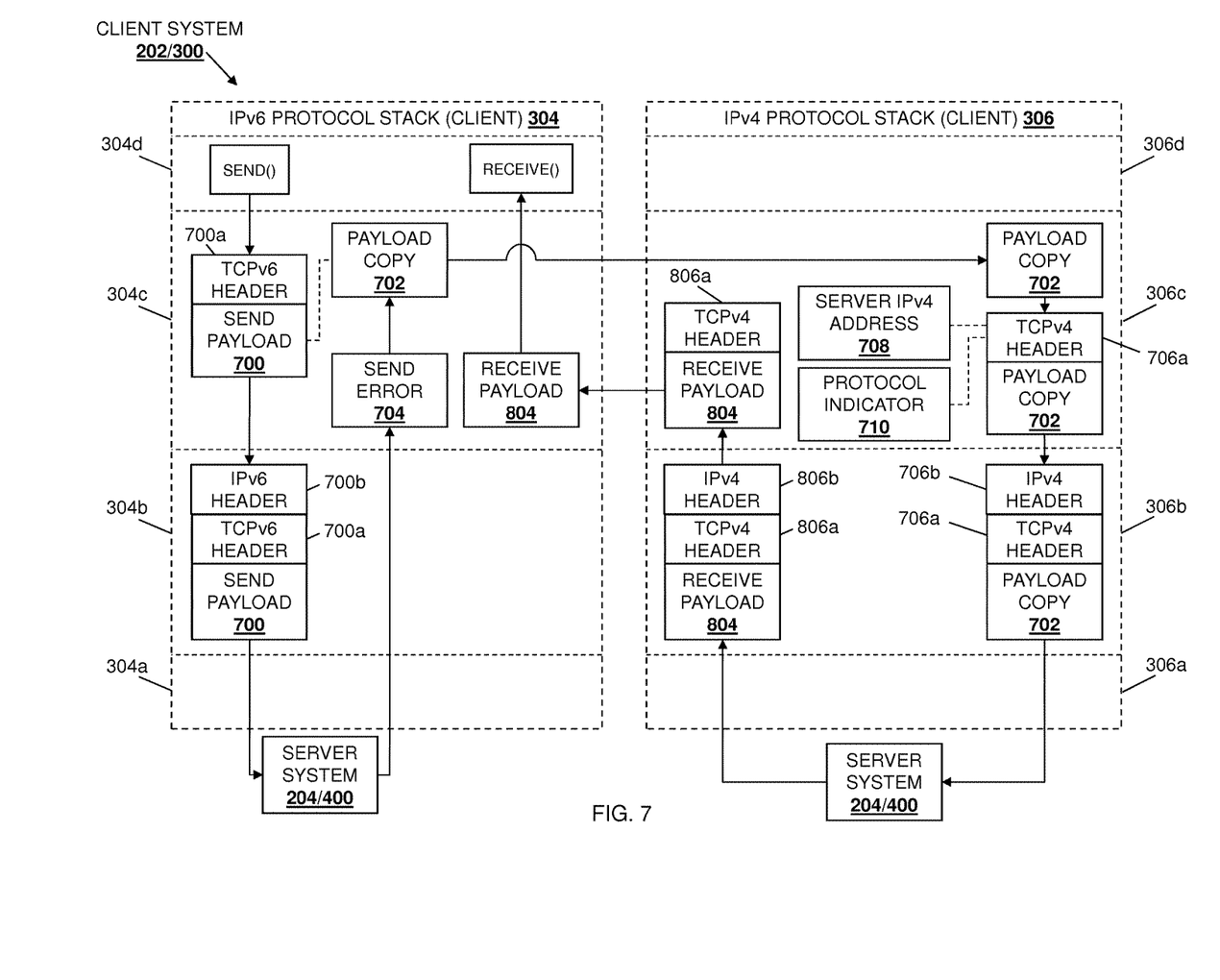
FIG. 7 is a flow diagram illustrating an embodiment of the client system of FIG. 3 transmitting and receiving communications using a second communication protocol in response to a first communication protocol failure.

The method 500 then proceeds to block 504 where the source system sends a first communication payload from a first protocol source application to a destination system using a source first protocol stack. Referring now to FIGS. 2, 3, and 7, in an embodiment of block 504, the IPv6 application 310 in the client system 300 creates a first communication payload (hereinafter a "send payload 700") and provides the send payload 700 to the IPv6 application layer 304d in the IPv6 protocol stack 304. In different embodiments, the first communication payload/send payload 700 may be any communication by the IPv6 application 310 in the client system 202/300 to the IPv6 application 410 in the server system 204/400, including a file transfer request, a Network File System (NFS)/Common Interest File System (CIFS) protocol command, other data requests, a request to perform a processing function, and/or a variety of other application communications known in the art.

In an embodiment, concurrent with or following the creation of the send payload 700, a copy of the first communication payload (hereinafter a "payload copy 702") is created and stored in a memory system or other storage device in the client system 202/300. In an embodiment, the payload copy 702 may include a copy of the send payload 700 such that the information that was included in the send payload 700 for communication to the IPv6 application 410 in the server system 204/400 is the same as the information included in the payload copy 702. In an embodiment, the send payload 700 may include an application layer header (not illustrated). While the payload copy 702 is illustrated as located in the TCPv6 layer 304c of the IPv6 protocol stack 304, one of skill in the art in possession of the present disclosure will recognize that the payload copy 702 may be stored elsewhere in the client system 202/300 prior to its provision to the TCPv4 layer 306c in the IPv4 protocol stack 306, as illustrated in FIG. 7 and discussed in further detail below. As discussed below, the payload copy 702 is created and stored for use in the event an error occurs with the sending of the first communication payload/send payload 700. As such, if no error occurs with the sending of the send payload 700 (e.g., no error notification is received in a predetermined amount of time, a receive payload is received in response to the send payload 700, etc.), the payload copy 702 may be removed from the memory system or other storage device in the client system 202/300.

The IPv6 application layer 304d then provides the send payload 700 to the TCPv6 layer 304c in the IPv6 protocol stack 304, and the TCPv6 layer 304c adds a TCPv6 header 700a to the send payload 700. The TCPv6 layer 304c provides the send payload 700 with the TCPv6 header 700a to the IPv6 layer 304b in the IPv6 protocol stack 304, and the IPv6 layer 304b adds an IPv6 header 700b to the send payload 700. The IPv6 layer 304b provides the send payload 700 with the TCPv6 header 700a and the IPv6 header 700b to the data link layer 304a in the IPv6 protocol stack 304, which operates with the communication system 308 to send the send payload 700 with the TCPv6 header 700a and the IPv6 header 700b over the Internet 206.

The method 500 then proceeds to block 506 where the source system receives an error associated with the sending of the first communication payload using the source first protocol stack. In an embodiment, in response to sending the send payload 700 with the TCPv6 header 700a and the IPv6 header 700b through the Internet 206, the client system 202/300 receives a send error 704 through the communication system 308 and the data link layer 304a in the IPv6 protocol stack 304. That send error 704 is then provided by the data link layer 304a to the IPv6 layer 304b in the IPv6 protocol stack 304, and the IPv6 layer 304b provides the send error 704 to the TCPv6 layer 304c in the IPv6 protocol stack 304. The embodiment illustrated in FIG. 7 shows the send payload 700 with the TCPv6 header 700a and the IPv6 header being provided to the server system 204/400 (i.e., through the Internet 206) and the send error 704 being returned by the server system 204/400 (i.e., through the Internet 206) to the client system 202/300. In different embodiments, errors may be returned to the client system 202/300 by network systems other than the server system 204/400 while remaining within the scope of the present disclosure. For example, the send error 704 may be provided to the client system 202/300 as a result of a stack corruption, a packet drop, a time out, a switch error, and/or due to a variety of other error situations known in the art. However, rather than provide the send error 704 to the IPv6 application 310 through the IPv6 application layer 304d as is done in conventional systems and that would result in the IPv6 application 310 ceasing to operate properly as discussed above, the send error 704 is stopped at the TCPv6 layer 304c in the IPv6 protocol stack 304 such that it is not transmitted to the IPv6 application layer 304d in the IPv6 protocol stack 304 such that it is provided to the IPv6 application 310 in the client system 202/300.

The method 500 then proceeds to block 508 where the source system sends a copy of the first communication payload to the destination system using a source second protocol stack. In an embodiment, at block 508, in response to receiving the send error 704, the client system 202/300 provides the payload copy 702 to its IPv4 protocol stack 306. While FIG. 7 includes a schematic illustration of the payload copy 702 being provided from the TCPv6 layer 304c in the IPv6 protocol stack 304 to the TCPv4 layer 306c in the IPv4 protocol stack 306, one of skill in the art in possession of the present disclosure will recognize that the payload copy 702 is illustrated in this manner to show how the copy of the first communication payload (i.e., the payload copy 702) is created and used during the method 500, and that the payload copy 702 was saved at block 504 may be provided to the TCPv4 layer 306c in the IPv4 protocol stack 306 in a variety of other manners known in the art.

Upon receiving the payload copy 702, the TCPv4 layer 306c in the IPv4 protocol stack 306 adds a TCPv4 header 706a to the payload copy 702. In an embodiment, the TCPv4 layer 306c retrieves the IPv4 address 708 of the server system 204/400 (e.g., that was retrieved in block 502 and stored in a memory system or other storage system in the client system 202/300), and provides that IPv4 address 708 in the TCPv4 header 706a. Furthermore, the TCPv4 layer 306c may also operate at block 508 to provide a protocol indicator 710 in the TCPv4 header 706a. For example, the TCPv4 layer 306c may operate to set a reserved bit protocol indicator in the TCPv4 header 706a that is used to indicate to the server system 204/400 that the payload copy 702 includes communications initiated using the IPv6 communication protocol, as discussed in further detail below. However, one of skill in the art in possession of the present disclosure will recognize that a variety of other protocol indicators may be provided at block 508 while remaining within the scope of the present disclosure. The TCPv4 layer 306c then provides the payload copy 702 with the TCPv4 header 706a to the IPv4 layer 306b in the IPv4 protocol stack 306, and the IPv4 layer 306b adds an IPv4 header 706b to the payload copy 702. The IPv4 layer 306b provides the payload copy 702 with the TCPv4 header 706a and the IPv4 header 706b to the data link layer 306a in the IPv4 protocol stack 306, which operates with the communication system 308 to send the payload copy 702 with the TCPv4 header 706a and the IPv4 header 706b over the Internet 206.

Figure 8:
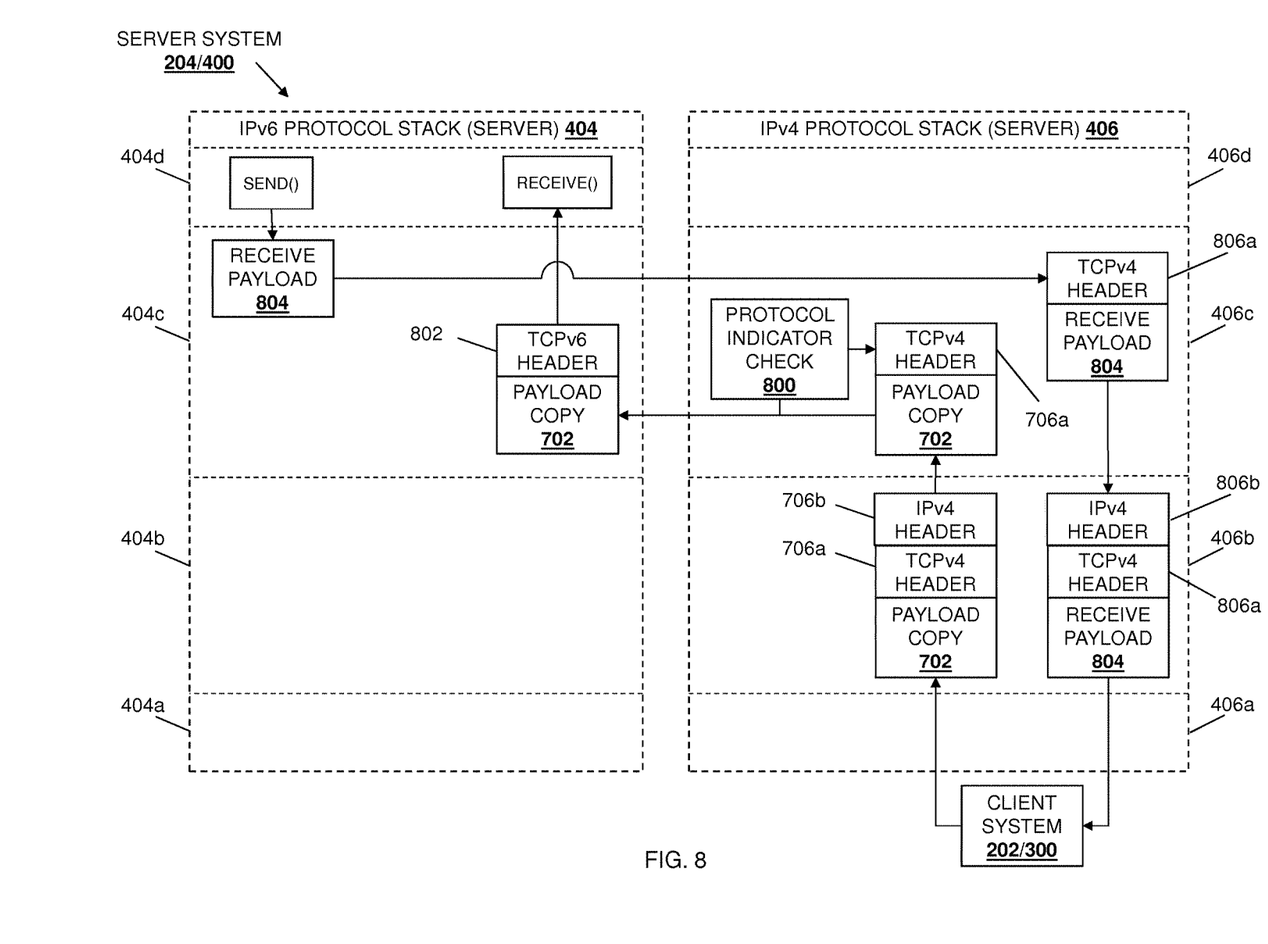
FIG. 8 is a flow diagram illustrating an embodiment of the server system of FIG. 4 receiving and transmitting communications using a second communication protocol in response to a first communication protocol failure.

The method 500 then proceeds to block 510 where the destination system receives the copy of the first communication payload using a destination second protocol stack. Referring now to FIGS. 2, 4, and 8, in an embodiment of block 510, the payload copy 702 with the TCPv4 header 706a and the IPv4 header 706b that was sent by the client system 202/300 at block 508 is received through communication system 408 and the data link layer 406a in the IPv4 protocol stack 406 in the server system 204/400, and the data link layer 406a provides the payload copy 702 with the TCPv4 header 706a and the IPv4 header 706b to the IPv4 layer 406b in the IPv4 protocol stack 406. The IPv4 protocol stack 406b processes and removes the IPv4 header 706b, and provides the payload copy 702 with the TCPv4 header to the TCPv4 layer 406c in the IPv4 protocol stack 406.

The method 500 then proceeds to block 512 where the destination system provides the copy of the first communication payload to the first protocol destination application using the destination first protocol stack. In an embodiment, at block 512, the TCPv4 layer 406c in the IPv4 protocol stack 406 performs a protocol indicator check 800 on the TCPv4 header 706a included with the payload copy 702 to determine whether the protocol indicator 710 was provided in the TCPv4 header 706z by the client system 202/300. For example, at block 512 the TCPv4 layer 406c in the IPv4 protocol stack 406 may check whether the reserved bit protocol indicator, discussed above as being set by the TCPv4 layer 306c in the IPv4 protocol stack 306 of the client system 202/300 at block 508, has been set in the TCPv4 header 706a. However, as discussed above, other protocol indicators may be provided with the payload copy 702, and thus one of skill in the art in possession of the present disclosure will recognize that other protocol indicator checks may be performed while remaining within the scope of the present disclosure. If no protocol indicator is included in a TCPv4 header of a received payload, then that received payload is processed using the IPv4 protocol stack, as is known in the art. However, if a received payload includes a protocol indicator, as with the payload copy 702 and TCPv4 header 706a with the protocol indicator 710 discussed above, the TCPv4 layer 406c in the IPv4 protocol stack 406 removes the TCPv4 header 706a from the payload copy 702, adds a TCPv6 header 802 to the payload copy 702, and provides the payload copy 702 with the TCPv6 header 802 to the TCPv6 layer 404c in the IPv6 protocol stack 404 of the server system 204/400. The TCPv6 layer 404c in the IPv6 protocol stack 404 then processes the TCPv6 header 802 and provides the payload copy 702 to the IPv6 application layer 404d in the IPv6 protocol stack 404. The IPv6 application layer 404d then provides the payload copy 702 to the IPv6 application 410 in the server system 204/400.

The method 500 then proceeds to block 514 where the first protocol destination application provides a second communication payload to the destination first protocol stack. In an embodiment, the IPv6 application 410 in the server system 204/400 receives the payload copy 702 from the IPv6 application layer 404d in the IPv6 protocol stack 404 at block 512, processes that payload copy 702, and creates a second communication payload (hereinafter a "receive payload 804") in response to receiving the copy of the first communication payload that was created by the client system 202/300. In different embodiments, the second communication payload/receive payload 804 may be any communication by the IPv6 application 410 in the server system 204/400 to the IPv6 application 310 in the client system 202/300, including a response to file transfer request, a response to an NFS/CIFS protocol command, a response to other data requests, a response to a request to perform a processing function, metadata, and/or a variety of other application communications known in the art. The receive payload 804 is provided by the IPv6 application 410 to the IPv6 application layer 404d in the IPv6 protocol stack 404.

The method 500 then proceeds to block 516 where the destination system sends the second communication payload to the source system using the destination second protocol stack. In an embodiment, the IPv6 application layer 404d in the IPv6 protocol stack 404 provides the receive payload 804 to the TCPv6 layer 404c in the IPv6 protocol stack 404. The TCPv6 layer 404c in the IPv6 protocol stack 404 then provides the receive payload 804 to the TCPv4 layer 406c in the IPv4 protocol stack 406. In an embodiment, after receiving and providing the payload copy 702 to the application layer 404d, the TCPv6 layer 404c may designate the subsequent receive payload 804 from the application layer 404c for provision to the TCPv4 layer 406c. However, other triggers for providing a receive payload from the TCPv6 layer 404c to the TCPv4 layer 406c will fall within the scope of the present disclosure. The TCPv4 layer 406c in the IPv4 protocol stack 406 then adds a TCPv4 header 806a to the receive payload 804, and provides the receive payload 804 with the TCPv4 header 806a to the IPv4 layer 406b in the IPv4 protocol stack 406. The IPv4 layer 406b adds an IPv4 header 806b to the receive payload 804, and provides the receive payload 804 with the TCPv4 header 806a and the IPv4 header 806b to the data link layer 406a in the IPv4 protocol stack 406. The data link layer 406a in the IPv4 protocol stack 406 operates with the communication system 408 to send the receive payload 804 with the TCPv4 header 806a and the IPv4 header 806b over the Internet 206.

The method 500 then proceeds to block 518 where the source system receives the second communication payload using the source second protocol stack. Referring back to FIGS. 2, 3, and 7, in an embodiment of block 518, the receive payload 804 with the TCPv4 header 806a and the IPv4 header 806b that was sent by the server system 204/400 at block 516 is received through communication system 308 and the data link layer 306a in the IPv4 protocol stack 306 in the client system 202/300, and the data link layer 306a provides the receive payload 804 with the TCPv4 header 806a and the IPv4 header 806b to the IPv4 layer 306b in the IPv4 protocol stack 306. The IPv4 protocol stack 306b processes and removes the IPv4 header 806b, and provides the receive payload 804 with the TCPv4 header 806a to the TCPv4 layer 306c in the IPv4 protocol stack 306. However, rather than provide the receive payload 804 to the IPv4 application layer 306d in the IPv4 protocol stack 306 as is done in conventional systems with IPv4 communications, the receive payload 804 is stopped at the TCPv4 layer 306c in the IPv4 protocol stack 306 such that it is not transmitted to the IPv4 application layer 306d in the IPv4 protocol stack 306. In an embodiment, the TCPv4 layer 306c may recognize the receive payload 804 returning on a path that the payload copy 702 was sent and, in response, not transmit the receive payload 804 to the IPv4 application layer 306d. In that or other embodiments, the TCPv4 layer 306c may not transmit the receive payload 804 to the IPv4 application layer 306d because there are no IPv4 application waiting for a receive payload.

The method 500 then proceeds to block 520 where the source system provides the second communication payload to the first protocol source application using the source first protocol stack. In an embodiment, at block 520, TCPv4 layer 306*c* in the IPv4 protocol stack 306 removes the TCPv4 header 806*a* from the receive payload 804, and provides the receive payload 804 to the TCPv6 layer 304*c* in the IPv6 protocol stack 304 of the client system 202/300. In an embodiment, the TCPv4 layer 306*c* may recognize the receive payload 804 returning on a path that the payload copy 702 was sent and, in response, provide the receive payload 804 to the TCPv6 layer 304*c*. In that or other embodiments, the TCPv4 layer 306*c* may provide the receive payload 804 to the TCPv6 layer 304*c* because there are no IPv4 application waiting for a receive payload. In response to receiving the receive payload 804, the TCPv6 layer 304*c* in the IPv6 protocol stack 304 may remove the send error 704 that was provided to the TCPv6 layer 304*c* at block 506. The TCPv6 layer 304*c* in the IPv6 protocol stack 304 then provides the receive payload 804 to the IPv6 application layer 304*d* in the IPv6 protocol stack 304, and the IPv6 application layer 304*d* provides the receive payload 804 to the IPv6 application 310 in the client system 202/300.

Thus, systems and methods have been described that provide, when an IPv6 communication protocol error occurs following an IPv6 application on a client system communicating with an IPv6 application on a server system, for the transmittal of the communication associated with the IPv6 communication protocol error using respective IPv4 communication stacks on the client system and server system in a manner that is transparent to the IPv6 applications. As such, the IPv6 applications on the client system and the server system will continue to operate properly following an IPv6 communication protocol error without the need to fix the IPv6 protocol stacks in the client system or the server system, without the need to modify the IPv6 applications on the client system or the server system, and/or with the need to perform any other corrective action. Thus, IPv6 applications on client systems and server systems may operate to communicate using the IPv6 communication protocol via their respective IPv6 protocol stacks until an error occurs, at which point the systems and methods of the present disclosure can provide for the transmittal of the communication associated with the error using IPv4 protocol stacks on the client system and server system without the knowledge of the IPv6 applications, followed by the continued communication between the client system and the server system using the IPv6 communication protocol via their respective IPv6 protocol stacks until a subsequent error occurs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A communication transmission system, comprising:
   a network;
   a server system that is coupled to the network; and
   a client system that is coupled to the network and that includes a first protocol client application that uses a first communication protocol, a client first protocol stack that is configured to transmit and receive communications using the first communication protocol, and a client second protocol stack that is configured to transmit and receive communications using a second communication protocol that is different than the first communication protocol, wherein the client system is configured to:
   establish, between the first protocol client application and a first protocol server application that is included on the server system, an application session;
   send, during the application session, a first communication payload from the first protocol client application through the network to the server system using the client first protocol stack;
   receive, during the application session, an error associated with the sending of the first communication payload using the client first protocol stack and, in response, send a copy of the first communication payload through the network to the server system using the client second protocol stack;
   receive, during the application session, a second communication payload through the network from the server system using the client second protocol stack, wherein the second communication payload is received in response to sending the first communication payload using the client second protocol stack; and
   provide, during the application session, the second communication payload to the first client protocol application using the client first protocol stack.

2. The communication transmission system of claim 1, wherein the client system is configured to:
   retrieve a server second protocol address through the network from the server system, wherein the copy of the first communication payload is sent through the network to the server system using the server second protocol address.

3. The communication transmission system of claim 1, wherein the client system is configured to:
   provide a first communication protocol indicator with the copy of the first communication payload that is sent through the network to the server system using the client second protocol stack, wherein the first communication protocol indicator indicates to the server system that the copy of the first communication payload includes communications initiated using the first communication protocol.

4. The communication transmission system of claim 1, wherein the receiving the error associated with the sending of the first communication payload using the client first protocol stack includes not transmitting the error to the first protocol client application.

5. The communication transmission system of claim 1, wherein the server system includes the first protocol server application that uses the first communication protocol, a server first protocol stack that is configured to transmit and receive communications using the first communication protocol, and a server second protocol stack that is configured to transmit and receive communications using the second communication protocol, wherein the server system is configured to:
   receive the copy of the first communication payload through the network from the client system using the server second protocol stack;
   provide the copy of the first communication payload to the first protocol server application using the server first protocol stack;
   receive the second communication payload from the first protocol server application using the server first protocol stack; and send the second communication payload through the network to the client system using the server second protocol stack.

6. The communication transmission system of claim 5, wherein the server system is configured to:
determine that the copy of the first communication payload includes a first communication protocol indicator using the server second protocol stack and, in response, provide the copy of the first communication payload to the first protocol server application using the server first protocol stack.

7. The communication transmission system of claim 1, wherein the first communication protocol is an Internet Protocol version 6 (IPv6) communication protocol, and wherein the second communication protocol is an Internet Protocol version 4 (IPv4) communication protocol.

8. An information handling system (IHS), comprising:
a communication system;
a processing system that is coupled to the communication system; and
a memory system that is coupled to the processing system and that includes instruction that, when executed by the processing system, cause the processing system to provide a communication engine that is configured to:
establish, through a network via the communication system using a first protocol application that operates via a first protocol stack that transmits and receives communications using a first communication protocol, an application session;
send, through the network via the communication system during the application session using the first protocol application that operates via the first protocol stack, a first communication payload;
receive, through the network via the communication system during the application session using the first protocol application that operates via the first protocol stack, an error associated with the sending of the first communication payload;
send, through the network via the communication system using a second protocol application that operates via a second protocol stack that transmits and receives communications using a second communication protocol that is different than the first communication protocol and in response to receiving the error, a copy of the first communication payload;
receive, through the network via the communication system during the application session using the second protocol application that operates via the second protocol slack and in response to sending the first communication payload using the second protocol stack, a second communication payload; and
provide the second communication payload to the first protocol application using the first protocol stack.

9. The IHS of claim 8, wherein the communication engine is configured to:
retrieve a second protocol address through the network, wherein the copy of the first communication payload is sent through the network using the second protocol address.

10. The IHS of claim 8, wherein the communication engine is configured to:
provide a first communication protocol indicator with the copy of the first communication payload that is sent through the network using the second protocol stack, wherein the first communication protocol indicator indicates that the copy of the first communication payload includes communications initiated using the first communication protocol.

11. The IHS of claim 8, wherein the receiving the error associated with the sending of the first communication payload using the first protocol stack includes not transmitting the error to the first protocol application.

12. The IHS of claim 8, wherein the communication engine is configured to:
copy the first communication payload from the first protocol application to a storage prior to sending a first communication payload through the network using the first protocol stack.

13. The IHS of claim 8, wherein the first communication protocol is an Internet Protocol version 6 (IPv6) communication protocol, and wherein the second communication protocol is an Internet Protocol version 4 (IPv4) communication protocol.

14. A method for transmitting communications, comprising:
establishing, by a source system using a first protocol source application in the source system that operates via a source first protocol stack in the source system that transmits and receives communications using a first communication protocol, an application session through a network between the first protocol source application and a destination system;
sending, by the source system during the application session, a first communication payload from the first protocol source application in the source system through the network to the destination system using the source first protocol stack in the source system that transmits and receives communications using the first communication protocol;
receiving, by the source system during the application session, an error associated with the sending of the first communication payload using the source first protocol stack and, in response, sending a copy of the first communication payload through the network to the destination system using a source second protocol stack in the source system that transmits and receives communications using a second communication protocol that is different than the first communication protocol;
receiving, by the source system during the application session, a second communication payload through the network from the destination system using the source second protocol stack, wherein the second communication payload is received in response to sending the first communication payload using the source second protocol stack; and
providing, by the source system, the second communication payload to the first protocol source application using the source first protocol stack.

15. The method of claim 14, further comprising:
retrieving, by the source system, a destination second protocol address through the network from the destination system, wherein the copy of the first communication payload is sent through the network to the destination system using the destination second protocol address.

16. The method of claim 14, further comprising:
providing, by the source system, a first communication protocol indicator with the copy of the first communication payload that is sent through the network to the destination system using the source second protocol stack, wherein the first communication protocol indicator indicates to the destination system that the copy of the first communication payload includes communications initiated using the first communication protocol.

17. The method of claim 14, wherein the receiving the error associated with the sending of the first communication payload using the source first protocol stack includes not transmitting the error to the first protocol source application.

18. The method of claim 14, further comprising:
receiving, by the destination system, the copy of the first communication payload through the network from the source system using a destination second protocol stack in the destination system that transmits and receives communications using the second communication protocol;
providing, by the destination system, the copy of the first communication payload to the first protocol destination application in the destination system using a destination first protocol stack in the destination system that transmits and receives communications using the first communication protocol;
receiving, by the destination system, the second communication payload from the first protocol destination application using the destination first protocol stack; and
sending, by the destination system, the second communication payload through the network to the source system using the destination second protocol stack.

19. The method of claim 18, further comprising:
determining, by the destination system, that the copy of the first communication payload includes a first communication protocol indicator using the destination second protocol stack and, in response, providing the copy of the first communication payload to the first protocol destination application using the destination first protocol stack.

20. The method of claim 14, wherein the first communication protocol is an Internet Protocol version 6 (IPv6) communication protocol, and wherein the second communication protocol is an Internet Protocol version 4 (IPv4) communication protocol.

* * * * *

UNITED STATES PATENT AND TRADEMARK OFFICE
CERTIFICATE OF CORRECTION

| | |
|---|---|
| PATENT NO. | : 10,015,093 B2 |
| APPLICATION NO. | : 14/704722 |
| DATED | : July 3, 2018 |
| INVENTOR(S) | : Ankit Singh et al. |

It is certified that error appears in the above-identified patent and that said Letters Patent is hereby corrected as shown below:

In the Claims

In Claim 8, Column 15, Line 50: please replace "slack" with --stack--

Signed and Sealed this
Twelfth Day of March, 2019

Andrei Iancu
*Director of the United States Patent and Trademark Office*